Dec. 16, 1952  R. H. GORHAM  2,621,940
SUPPORT AND COUPLING MECHANISM FOR TRACTOR DRAWN VEHICLES
Filed March 8, 1950  2 SHEETS—SHEET 1
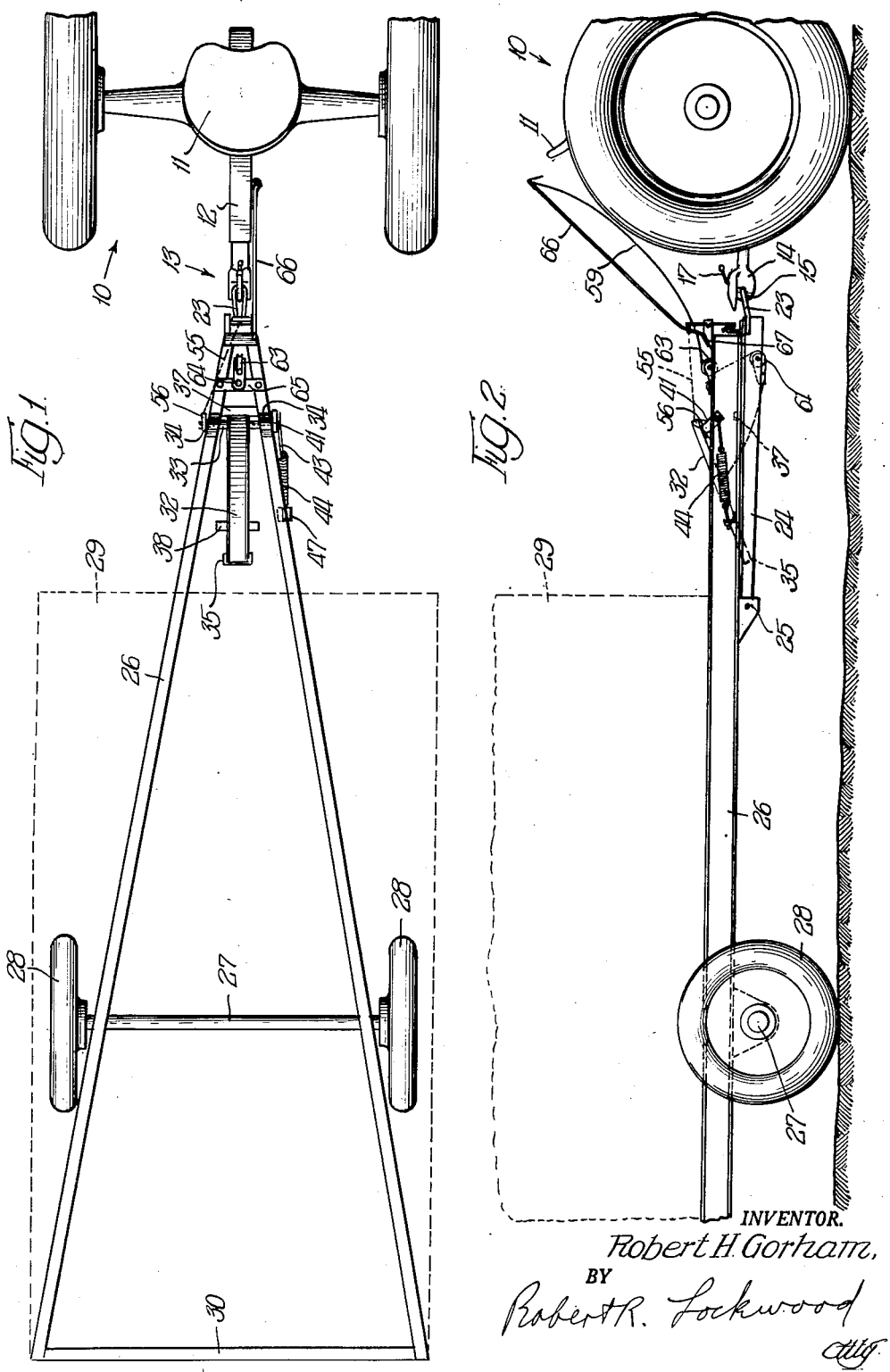
INVENTOR.
Robert H. Gorham,
BY
Robert R. Lockwood
ATTY.

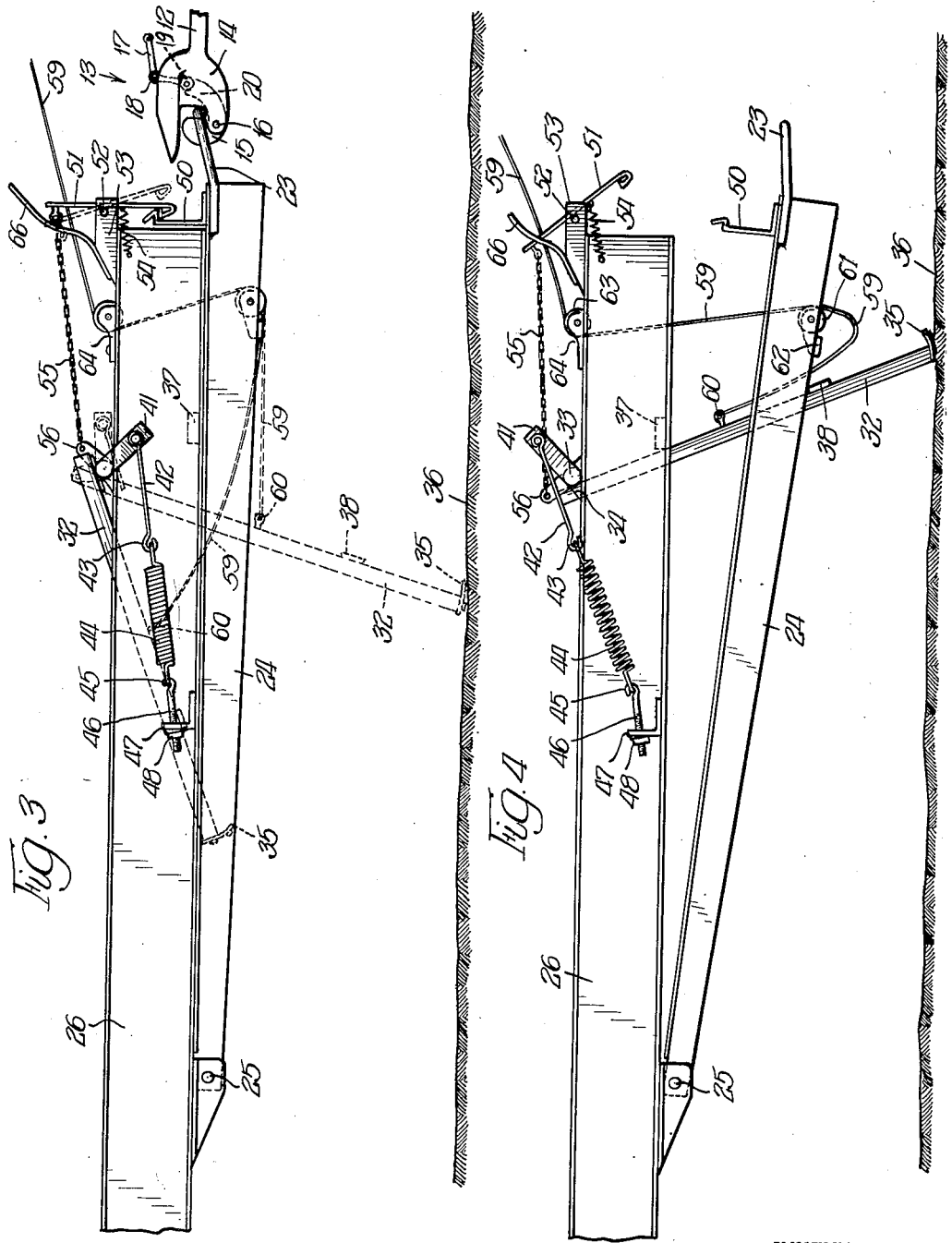

Patented Dec. 16, 1952

2,621,940

UNITED STATES PATENT OFFICE 2,621,940

SUPPORT AND COUPLING MECHANISM FOR TRACTOR DRAWN VEHICLES

Robert H. Gorham, Kendall, Wis.

Application March 8, 1950, Serial No. 148,359

13 Claims. (Cl. 280—33.44)

This invention relates, generally, to tractor drawn vehicles and it has particular relation to supporting the forward end of two wheeled vehicles and coupling the same to a tractor or the like.

Among the objects of this invention are: To provide simple, efficient, and economical means for coupling a vehicle, such as a two wheeled trailer, to a tractor or the like and for uncoupling it therefrom; to support the forward end of the vehicle when it is uncoupled from the tractor; to accommodate various heights of the tractor coupling means without requiring any change in elevation of the forward end of the vehicle; to couple the tractor to the vehicle through a draft tongue pivoted underneath the vehicle frame; to latch the draft tongue to the vehicle when the tractor is coupled to the draft tongue; to control the latch in accordance with the movement of the support member that holds the forward end of the vehicle in elevated position from the transport position to the support position and vice versa; to control the movement of the support member from the transport position to the support position from the operator's seat on the tractor; to control the elevation of the draft tongue for coupling to the tractor from the operator's seat on the tractor; and to employ a single cable or rope for effecting these controls.

Other objects of this invention will, in part, be obvious and in part appear hereinafter.

This invention is disclosed in the embodiment thereof shown in the accompanying drawings, and it comprises the features of construction, combination of elements and arrangement of parts which will be exemplified in the construction hereinafter set forth and the scope of the application of which will be indicated in the appended claims.

For a more complete understanding of the nature and scope of this invention, reference may be had to the following detailed description, taken together with the accompanying drawings, in which:

Figure 1 is a top plan view of the frame of a two wheeled vehicle and of a tractor coupled thereto by means constructed in accordance with this invention;

Figure 2 is a view, in side elevation, of the vehicle and tractor shown in Figure 1;

Figure 3 is a view, in side elevation and at an enlarged scale, of the forward end of the frame of the vehicle, showing the draft tongue coupled to the coupling device on the tractor drawbar; and Figure 4 is a view, similar to Figure 3, showing the tractor detached from the draft tongue and the support member swung into ground engaging position for holding the forward end of the vehicle frame in elevated position.

Referring now particularly to Figures 1 and 2 of the drawings, it will be observed that the reference character 10 designates, generally, a tractor of conventional construction having a centrally located seat 11 and a centrally disposed drawbar 12. At the rear end of the drawbar 12 is an automatic coupler of conventional construction the details of which are shown more clearly in Figure 3. As there shown, the automatic coupler 13 includes a head 14 which may constitute an integral extension of the drawbar 12. A yoke 15 is pivoted at 16 on the head 14 and is arranged to be held in the closed position by a latch lever 17 which is of bell crank shape. The latch lever 17 is pivoted at 18 on the head 14 and one arm carries a roller 19 for engagement in a suitable recess in one arm 20 of the yoke 15. It is again pointed out that the coupler 13 is of conventional construction and that any other suitable coupling means can be employed in practicing the present invention.

The automatic coupler 13 is arranged to have coupling engagement with an eye 23 in the form of a loop of heavy gauge wire or the like which may be welded at its ends to the forward end of a draft tongue 24. The draft tongue 24 is generally V-shaped with the point or apex of the V extending forwardly. The draft tongue 24 is hinged at 25 near its rear end to the under side of a vehicle frame 26. As shown in Figure 1 the vehicle frame 26 is formed in a V shape, similar to the shape of the draft tongue 24. It is supported well past its center by an axle 27 which has wheels 28 at its ends. Any suitable body 29 can be carried by the frame 26. For illustrative purposes the body 29 is shown by the broken line outline thereof. It is preferred that the construction be such that the weight applied to the frame 26 will cause the forward end of the vehicle frame 26 to tend to swing toward the ground.

Preferably the draft tongue 24 and the vehicle frame 26 are formed from I-shaped steel beams. The draft tongue 24 may be formed by longitudinally and angularly splitting an I-beam so as to provide two members having maximum width at the front ends, as shown in Figures 3 and 4, and tapering to a minimum width at the rear ends. The vehicle frame 26 is made up of two I-shaped members which may be of uniform width throughout. They are welded together at their forward ends and at their rear ends are joined by a cross member 30.

As indicated hereinbefore, it is desirable to support the forward end of the vehicle frame 26 when the coupler 13 is uncoupled from the eye 23. It will be understood that the eye 23 constitutes coupling means at the forward end of the draft tongue 24 and that coupling means of other construction can be employed without departing from the scope of this invention. In order to support the forward end of the vehicle frame 26 when the eye 23 no longer is coupled to the tractor 10, a support member 32 is employed. The support member 32 preferably is formed from a channel shaped steel beam and is welded near its upper end to a transversely extending shaft 33 that is journalled in bearings 34 that are carried by the upper flanges of the I-beams making up the vehicle frame 26. The support member 32, in this manner, is pivotally mounted on the vehicle frame 26 and is arranged to be swung from the transport position shown by full lines in Figures 1, 2 and 3 to the support position shown by full lines in Figure 4. At its lower end the support member 32 is provided with a ground engaging pad or foot 35 that, as shown in Figures 3 and 4, is arranged to engage the ground 36. The pad or foot 35 is of sufficient size so as to prevent the lower end of the support member 32 from readily penetrating the ground surface. Where desired, the support member 32 can be made adjustable so that its length can be varied when required.

With a view to positioning the support member 32 in the support position as shown in Figure 4, a stop member or bumper 37 is employed. The stop member or bumper 37 preferably comprises a bar the ends of which are welded to the upper sides of the inwardly extending flanges along the lower sides of the I-beams making up the vehicle frame 26. It will be understood that the support member 32 bears against the rear edge of the stop member or bumper 37, as shown in Figure 4, and, since it is pivoted on the shaft 33, when the pad or foot 35 is in engagement with the surface of the ground 36, the forward end of the vehicle frame 26 is supported as shown. It is desirable to limit the extent that the draft tongue 24 can swing downwardly after the eye 23 or coupling means is uncoupled from the tractor 10. In order to limit the downward movement of the draft tongue 24, a stop member 38 in the form of a plate is secured, as by welding, to the channel shaped support member 32, as shown in Figure 4. The stop member or plate 38 extends transversely of the support member 32 sufficiently far on each side so that the lower edges of the beams making up the draft tongue 24 will engage the same.

The support member 32 is held in the transport position or in the support position by the mechanism shown in Figures 3 and 4. A spring arm 41 is secured to one end of the shaft 33 and has a link 42 pivoted thereto at one end. At the other end the link 42 has a hook 43 for connection to one end of a tension spring 44. The other end of the tension spring 44 is secured to a hook 45 which is located at one end of a bolt 46. It will be observed that the bolt 46 extends through an anchor member 47, in the form of an angle, which may be welded to the lower outstanding flange of one of the I-beams making up the vehicle frame 26. The tension of the spring 44 can be adjusted by tightening or loosening the nut 48 on the bolt 46. The position of the spring arm 41 on the shaft 33 is such that the tension spring 44 shifts past a line between the anchor member 47 and the axis of rotation of the shaft 33 when the support member 32 is swung from the transport position, Figure 3, to the support position, Figure 4. In the transport position the tension spring 44 serves to hold the support member 32 against the vehicle frame 26 and entirely out of the way. The tension spring 44 also functions when it has moved past the central position to hold the support member 32 against the stop member or bumper 37 in the support position.

When the draft tongue 24 is coupled to the tractor 10, it is desirable that the draft tongue 24 also be connected to the vehicle frame 26 so that the two function as a unit. For this purpose a dentent 50 is secured, as by welding, to the upper side of the forward end of the draft tongue 24. The detent 50 is arranged to cooperate with a latch 51 which is pivoted at 52 on a plate 53 that is carried by the forward end of the vehicle frame 26 at the upper side. The latch 51 is biased to the latched position by a tension spring 54.

When the support member 32 is to be swung from the transport position to the support position, it is desirable that the latch 51 be moved out of latching engagement with the detent 50. For this purpose a chain 55 is connected to the upper end of the latch 51. The chain 55 is connected at its other end to a latch release arm 56 that is fast on the end of the shaft 33 opposite the end where the spring arm 41 is secured. Thus, when the support member 32 is swung from the transport position, shown in Figure 3, to the support position shown in Figure 4, the latch release arm 56 is swung conjointly therewith and during its initial movement its swings the latch 51 in a counterclockwise direction against the tension of the spring 54 to unlatch the detent 50 and permit separation of the vehicle frame 26 from the draft tongue 24.

Of course it is possible to swing the support member 32 from the support position to the ground engaging position by actually gripping it and swinging it. Also it is possible to swing the draft tongue 24 upwardly toward the vehicle frame 26 in a like manner. However, it is preferable to provide for controlling the movement of the support member 32 and of the draft tongue 24 by the operator located in the seat 11 on the tractor 10. For this purpose a cable or rope 59 is provided. One end of the cable or rope 59 is connected to an eye bolt 60 which is secured to the front side of the support member 32 intermediate its ends. The cable or rope 59 is trained over a sheave 61 that is carried on a cross member 62 that may be secured, as by welding, to the underside of the draft tongue 24. Also the cable or rope 59 is trained over a sheave 63 that is carried by a bracket 64, Figure 1, which may be mounted on a cross member 65 that is secured to the upper side of the vehicle frame 26 near its forward end. The other end of the cable or rope 59 is fastened to the upper end of a mast 66 that may be secured, as by welding, to the plate 53 near the forward end of the vehicle frame 26. The mast 66 is flexible and can be shifted to various positions as may be desired so as to place the cable or rope 59 in position where it may be grabbed by the operator and yet will be out of his way at other times.

In describing the operation of the support and coupling mechanism shown in the drawings and described hereinbefore, it will be assumed first that the coupler 13 is connected to the eye 23 and that the support member 32 is in the transport position as shown in Figure 3. The operator pulls on the cable or rope 59 and swings the support member 32 to the broken line position shown in Figure 3 where the pad or foot 35 engages the surface of the ground 36. Then he backs the tractor 10 slightly. While the support member 32 is being swung from the transport position to the broken line position, the latch 51 disengages the detent 50 so that the draft tongue 24 no longer is latched to the vehicle frame 26. When the tractor 10 is backed up, the support member 32 is swung to the full line position shown in Figure 4. This lifts the forward end of the vehicle frame 26 slightly away from the draft tongue 24. This is permitted, however, since the latch 51 has been unlatched from the detent 50.

Now the latch lever 17 on the coupler 13 can be operated to permit the yoke 15 to be swung so as to disengage the eye 23 when the tractor 10 is moved away from the vehicle frame 26 or forwardly. The draft tongue 24 then falls downwardly or swings about the pivot axis 25 until it engages the stop member or plate 38. This is shown in Figure 4.

Now when the tractor 10 is to be coupled to the vehicle frame 26, it is backed into such position that the eye 23 is in alignment with the coupler 13. The operator then grabs the cable or rope 59 and pulls on it. Since it is trained over the sheave 61 on the draft tongue 24, the latter is swung upwardly. The operator adjusts the elevation of the eye 23 so that it registers properly with the coupler 13 in the open position. Then the tractor 10 is backed slightly and the eye 23 is engaged automatically by the coupler 13. Now the tractor 10 is moved forward slightly. This causes the vehicle frame 26 to be raised slightly as the support member is swung from the position shown by full lines in Figure 4 to the position shown by the broken lines in Figure 3. As soon as the support member 32 is swung to such position that the pad or foot 35 no longer engages the surface of the ground 36, the spring 44 acts to swing it to the transport position shown by full lines in Figure 3. The load on the vehicle frame 26 is such that it swings downwardly and the latch 51 engages the detent 50. The tractor 10 then can be operated to pull the trailer of which the vehicle frame 26 forms a part in conventional manner.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Support and coupling means for a tractor drawn vehicle comprising, in combination, a ground engageable support member pivoted on the vehicle near the front thereof and swingable from a support position to a transport position, a spring cooperating with said support member to bias it to its transport position, a draft tongue pivoted on the vehicle rearwardly of the pivot axis of said support member and extending forwardly past the same to swing toward and away from the underside of said vehicle, coupling means on said draft tongue for connection to the tractor, and a single means operatively connected to said draft tongue and support member and operable by an operator on the tractor to raise said draft tongue and coupling means thereon into coupling position with the tractor when said support member against the biasing action of said spring to support position when said draft tongue is coupled to the tractor.

2. Support and coupling means for a tractor drawn vehicle comprising, in combination, a ground engageable support member pivoted on the vehicle near the front thereof and swingable from a support position to a transport position, a spring cooperating with said support member to bias it to its transport position, a draft tongue pivoted on the vehicle rearwardly of the pivot axis of said support member and extending forwardly past the same to swing forward and away from the underside of said vehicle, coupling means on said draft tongue for connection to the tractor, and a cable connected to said support member and trained over said draft tongue for tensioning by an operator on the tractor to raise said draft tongue and coupling means thereon into coupling position with the tractor when said support member is in support position and to swing said support member against the biasing action of said spring to support position when said draft tongue is coupled to the tractor.

3. Support and coupling means for a tractor drawn vehicle comprising, in combination, a ground engageable support member pivoted on the vehicle near the front thereof and swingable from a support position to a transport position, a spring cooperating with said support member to bias it to its transport position, a draft tongue pivoted on the vehicle rearwardly of the pivot axis of said support member and extending forwardly past the same to swing toward and away from the underside of said vehicle, latch means cooperating with the vehicle and said draft tongue to interconnect the same so that they function unitarily, coupling means on said draft tongue for connection to the tractor, and a single means operatively connected to said draft tongue and support member and operable by an operator on the tractor to raise said draft tongue and coupling means thereon into coupling position with the tractor when said support member is in support position and to swing said support member against the biasing action of said spring to support position when said draft tongue is coupled to the tractor.

4. Support and coupling means for a tractor drawn vehicle comprising, in combination, a ground engageable support member pivoted on the vehicle near the front thereof and swingable from a support position to a transport position, a spring cooperating with said support member to bias it to its transport position, a draft tongue pivoted on the vehicle rearwardly of the pivot axis of said support member and extending forwardly past the same to swing toward and away from the underside of said vehicle, latch means cooperating with the vehicle and said draft tongue to interconnect the same so that they function unitarily, means operatively interconnecting said support member and said latch means to unlatch the latter when the former is swung to supporting position to permit said draft tongue to swing away from the vehicle, coupling means on said draft tongue for connection to the tractor, and a single means operatively connected to said draft tongue and support member and operable by an operator on the tractor to raise said draft tongue and coupling means thereon into coupling position with the tractor when said support member is in support position and to swing said support member against the biasing action of said spring to support position when said draft tongue is coupled to the tractor.

5. Support and coupling means for a tractor drawn vehicle comprising, in combination, a ground engageable support member pivoted on the vehicle near the front thereof and swingable from a support position to a transport position, stop means on the vehicle cooperating with said support member to hold it in support position, a spring cooperating with said support member to bias it to its transport position, a draft tongue pivoted on the vehicle rearwardly of the pivot axis of said support member and extending forwardly past the same to swing toward and away from the underside of said vehicle, stop means on said support member cooperating with said draft tongue when the former is in support position to limit the extent of downward movement of said draft tongue, coupling means on said draft tongue for connection to the tractor, and a single means operatively connected to said draft tongue and support member and operable by an operator on the tractor to raise said draft tongue and coupling means thereon into coupling position with the tractor when said support member is in support position and to swing said support member against the biasing action of said spring to support position when said draft tongue is coupled to the tractor.

6. Support and coupling means for a tractor drawn vehicle comprising, in combination, a ground engageable support member pivoted on the vehicle and swingable from a support position to a transport position, stop means on the vehicle cooperating with said support member to hold it in support position, overcenter spring means interconnecting said support member and the vehicle to hold the former in transport position or against said stop means in support position, a draft tongue pivoted on the vehicle to swing toward and away from the underside thereof, a detent on said draft tongue, a latch member pivoted on the vehicle for cooperating with said detent, a spring biasing said latch member into engagement with said detent, a connecting member between said latch member and said support member for moving the former out of engagement with said detent when said support member is swung to supporting position to permit said draft tongue to swing away from the vehicle, stop means on said support member cooperating with said draft tongue to limit the downward movement thereof, coupling means at the forward end of said draft tongue for connection to the tractor, a sheave on said draft tongue, and a cable connected to said support member and trained over said sheave for tensioning by an operator on the tractor to raise said draft tongue and coupling means thereon into coupling position with the tractor when said support member is in support position and to swing said support member against the biasing action of said spring to support position when said draft tongue is coupled to the tractor.

7. Support and coupling means for a tractor drawn vehicle comprising, in combination, a ground engageable support pivoted on the vehicle and swingable from a support position to a transport position, over center spring means interconnecting said support and the vehicle to bias the former to either of said positions, a draft tongue pivoted on the vehicle, latch means cooperating with the vehicle and said draft tongue to interconnect the same so that they function as a unit, means operatively interconnecting said support member and said latch means to unlatch the latter when the former is swung to supporting position to permit said draft tongue to swing away from the vehicle, and coupling means on said draft tongue for connection to the tractor.

8. Support and coupling means for a tractor drawn vehicle comprising, in combination, a ground engageable support pivoted on the vehicle and swingable from a support position to a transport position, over center spring means interconnecting said support and the vehicle to bias the former to either of said positions, a draft tongue separate and distinct from said support member pivoted on the vehicle about an axis fixed with respect thereto and extending transversely thereof, latch means cooperating with the vehicle and said draft tongue to interconnect the same so that they function as a unit, means operatively interconnecting said support member and said latch means to unlatch the latter when the former is swung to supporting position to permit said draft tongue to swing away from the vehicle, and coupling means on said draft tongue for connection to the tractor.

9. Support and coupling means for a tractor drawn vehicle comprising, in combination, a ground engageable support pivoted on the vehicle near the front thereof and swingable from a support position to a transport position, over center spring means interconnecting said support and the vehicle to bias the former to either of said positions, a draft tongue pivoted on the vehicle rearwardly of the pivot axis of said support member and extending forwardly past the same, latch means cooperating with the vehicle and said draft tongue to interconnect the same so that they function as a unit, means operatively interconnecting said support member and said latch means to unlatch the latter when the former is swung to supporting position to permit said draft tongue to swing away from the vehicle, coupling means on said draft tongue for connection to the tractor, and a flexible member connected to said support intermediate its ends and trained over said draft tongue near its forward end for tensioning by an operator on the tractor to raise said draft tongue and coupling means thereon into coupling position with the tractor when said support member is in support position and to swing said support past the center position against the biasing action of said spring means to the support position when said draft tongue is coupled to the tractor.

10. Supporting and coupling means for a tractor drawn vehicle comprising, in combination, a ground engageable support member pivoted on the vehicle and swingable from a support position to a transport position, a draft tongue separate and distinct from said support member pivoted on the vehicle about an axis fixed with respect thereto and extending transversely thereof, latch means cooperating with the vehicle and said draft tongue to interconnect the same so that they function unitarily, means operatively interconnecting said support member and said latch means to unlatch the latter when the former is swung to supporting position to permit said draft tongue to swing away from the vehicle, and coupling means on said draft tongue for connection to the tractor.

11. Support and coupling means for a tractor drawn vehicle comprising, in combination, a ground engageable support member pivoted on the vehicle and swingable from a support position to a transport position, a draft tongue separate and distinct from said support member pivoted on the vehicle to swing toward and away from the underside thereof about an axis fixed with respect thereto and extending transversely thereof, latch means cooperating with the vehicle and said draft tongue to interconnect the same so that they function unitarily, means operatively interconnecting said support member and said latch means to unlatch the latter when the former is swung to supporting position to permit said draft tongue to swing away from the vehicle, and coupling means on said draft tongue for connection to the tractor.

12. Support and coupling means for a tractor drawn vehicle comprising, in combination, a ground engageable support member pivoted on the vehicle near the front thereof and swingable from a support position to a transport position, stop means on the vehicle cooperating with said support member to hold it in support position, a draft tongue separate and distinct from said support member pivoted on the vehicle rearwardly of the pivot axis of said support member and extending forwardly past the same to swing toward and away from the underside of said vehicle about an axis fixed with respect thereto and extending transversely thereof, stop means on said support member cooperating with said draft tongue when the former is in support position to limit the extent of downward movement of said draft tongue, and coupling means on said draft tongue for connection to the tractor.

13. Support means for a tractor drawn vehicle having a main frame to permit coupling and uncoupling therebetween without requiring the driver to leave his seat on the tractor comprising, in combination, a draft tongue pivoted at its rear end on said main frame for movement toward and away from the underside thereof and extending toward its forward end, coupling means on the forward end of said draft tongue for connection to coupling means on the tractor, a ground engageable support member pivoted on said main frame about an axis forwardly of the pivot axis of said draft tongue, and a flexible member fast at one end to said support member intermediate its ends and trained over said draft tongue near its forward end and arranged to have its other end grasped by the operator, said flexible member when pulled by the operator with the tractor coupled to said draft tongue acting to swing said support member into engagement with the ground, whereupon said main frame is raised on backward movement of the tractor and held in elevated position by said support member and said draft tongue can be uncoupled, said flexible member when pulled by the operator as the tractor approaches said main frame in the elevated position acting to raise said draft tongue to coupling position.

ROBERT H. GORHAM.

REFERENCES CITED

The following references are of record in the file of this patent:

UNITED STATES PATENTS

| Number | Name | Date |
|---|---|---|
| 1,471,548 | Clement | Oct. 23, 1923 |
| 2,225,157 | Court | Dec. 17, 1940 |
| 2,256,310 | Braley et al. | Sept. 16, 1941 |
| 2,309,618 | Hyland | Jan. 26, 1943 |
| 2,332,326 | Lex | Oct. 19, 1943 |
| 2,400,145 | Zink et al. | May 14, 1946 |
| 2,474,483 | Luttrell | June 28, 1949 |